United States Patent [19]
Riley

[11] Patent Number: 5,129,261
[45] Date of Patent: Jul. 14, 1992

[54] THREE WIRE POTENTIOMETRIC LIQUID LEVEL SENSOR

[75] Inventor: Richard E. Riley, Riverside, Calif.

[73] Assignee: Spectrol Electronics Corporation, Ontario, Calif.

[21] Appl. No.: 658,103

[22] Filed: Feb. 20, 1991

[51] Int. Cl.⁵ ............................................. G01F 23/24
[52] U.S. Cl. ......................................... 73/313; 338/33
[58] Field of Search ................. 73/313, 304 R, 308, 73/DIG. 5; 338/33

[56] References Cited

U.S. PATENT DOCUMENTS

| | | |
|---|---|---|
| 2,484,690 | 10/1949 | DeGiers . |
| 4,052,901 | 10/1977 | Bjork . |
| 4,084,436 | 4/1978 | Smitherman ............... 73/DIG. 5 |
| 4,454,761 | 6/1984 | Coulange . |
| 4,567,762 | 2/1986 | Hoppert et al. . |
| 4,702,107 | 10/1987 | Guerrini et al. . |
| 4,724,705 | 2/1988 | Harris ............................ 338/33 |
| 4,827,769 | 5/1989 | Riley et al. . |
| 4,920,798 | 5/1990 | Weaver . |

FOREIGN PATENT DOCUMENTS 2758379 11/1978 Fed. Rep. of Germany .

Primary Examiner—Daniel M. Yasich
Attorney, Agent, or Firm—Woodard, Emhardt, Naughton, Moriarty & McNett

[57] ABSTRACT

A three wire potentiometric liquid level sensor for measuring liquid levels in a container is disclosed. The sensor includes a conductive strip, a float, a contact means attached to the float, a resistive strip, and a conductive rod buried beneath an insulator. A second embodiment of the invention includes a first conductive strip, a second conductive strip, a float, a contact means attached to the float, and an insulating rod. The sensor produces a resistance directly proportional to the liquid level in the container.

16 Claims, 4 Drawing Sheets

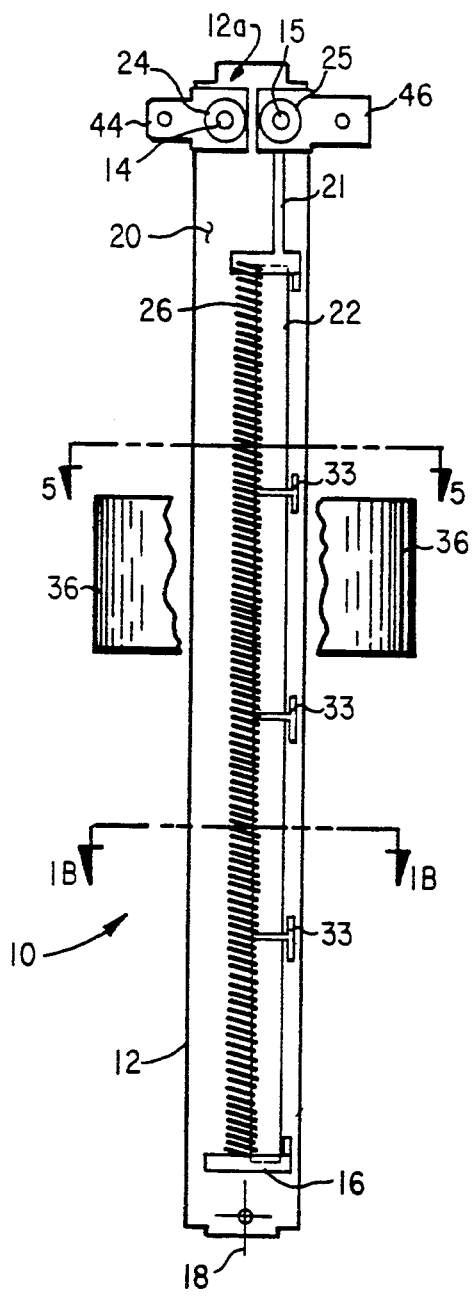
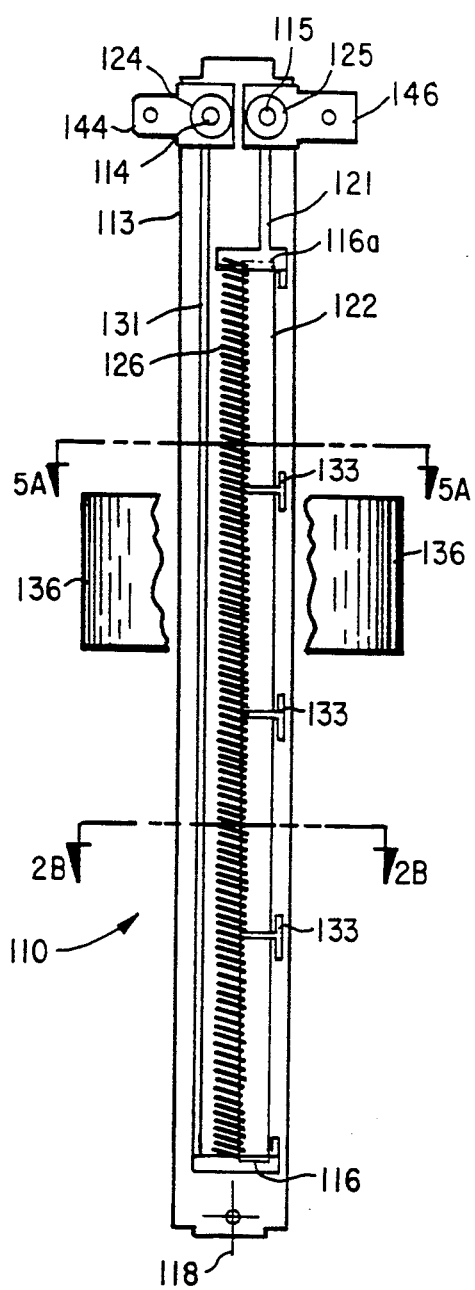
Fig.1
Fig.2
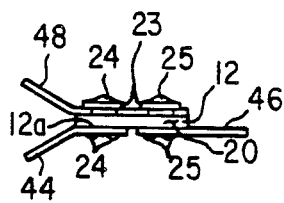
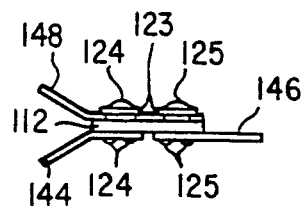
Fig. 1A
Fig.2A

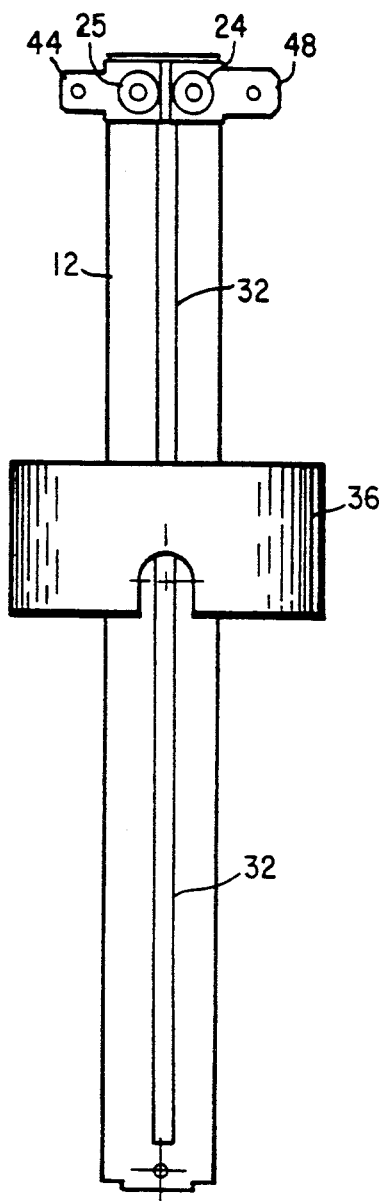
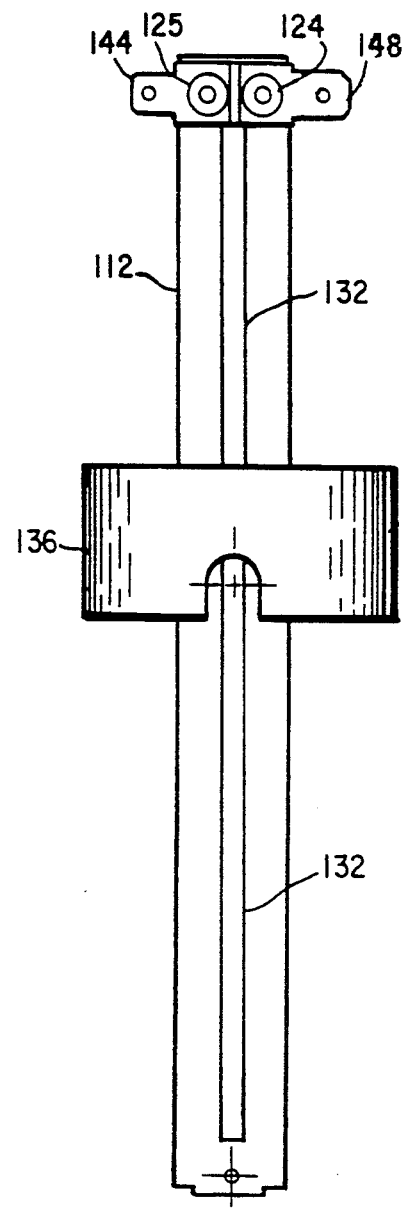
Fig.3
Fig.3A
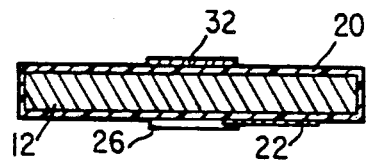
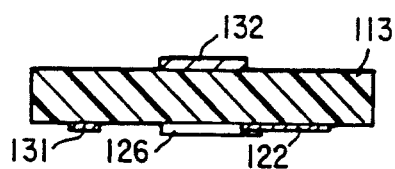
Fig. 1B
Fig. 2B

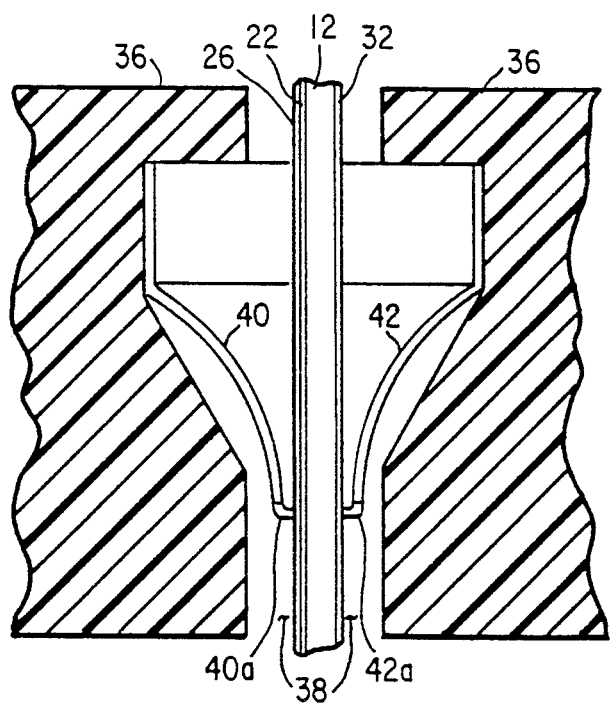
Fig. 4
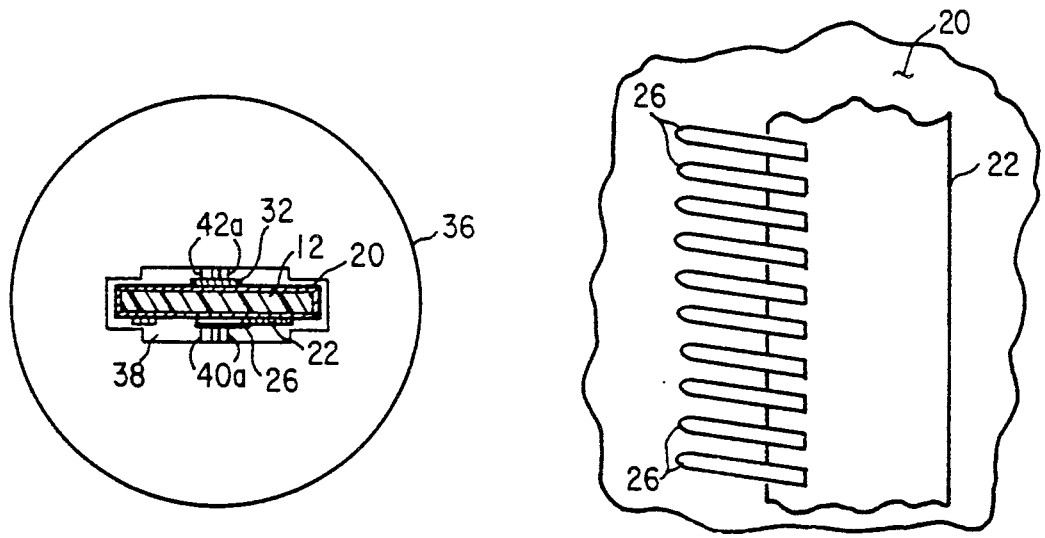
Fig. 5
Fig. 6

THREE WIRE POTENTIOMETRIC LIQUID LEVEL SENSOR

FIELD OF THE INVENTION

This invention relates to devices for detecting liquid level within a container, and more specifically to sensors for sensing the liquid level of fuel in a motor vehicle fuel tank.

BACKGROUND OF THE INVENTION

The most commonly used fluid level sensor is the variable resistor sensor utilizing a float to produce a resistance change in the variable resistor. As the float moves vertically with the fluid level, the electrical resistance of the sensor changes typically from 10 to 400 ohms. In most sensors, a sliding or moving contact attached to the float establishes a resistive circuit based upon the position of the contact with respect to a wire-wound resistor or a thick film resistor printed on an insulating base or substrate.

Other approaches to fluid level detection include the use of resistors with large temperature coefficients, known as thermistors, located at various vertical positions in the fluid reservoir. As electrical power is applied to the resistors, the devices immersed in the fluid remain cool while those that are exposed to air will increase in temperature and produce a change in overall resistance of the device. Extensive signal conditioning and temperature compensation circuitry is typically required with such a sensor to create a usable signal. Fluid compatibility and manufacturing costs limit widespread acceptance of this type of device.

A vertical sensor with a sliding contact has been used in some automotive applications. Typically a float provides a contact point with respect to a resistor. The resistor is usually a wire helix wound about an insulating mandrel.

Examples of prior art fluid level sensors are shown in the following patents: Weaver, U.S. Pat. No. 4,920,798, Riley et al., U.S. Pat. No. 4,827,769, Guerrini et al., U.S. Pat. No. 4,702,107, Hoppert et al., U.S. Pat. No. 4,567,762, Coulange, U.S. Pat. No. 4,454,761, Bjork, U.S. Pat. No. 4,052,901, DeGiers, U.S. Pat. No. 2,484,690, and German Patent 2758379.

An example of thick film resistor technology used in a liquid level sensor is shown in Weaver, U.S. Pat. No. 4,920,798. The Weaver device includes a thick film resistive coated plate with a slidable contact member providing a resistance in proportion to the position of a float mounted on an adjacent rod.

Riley et al., U.S. Pat. No. 4,827,769, discloses a fuel level sensor including a soft steel substrate encased in porcelain with a cerment thick film resistive track deposited thereon. The Riley device provides a resistance proportional to float position.

Guerrini et al., U.S. Pat. No. 4,702,107, discloses a device for detecting the level of a liquid contained in a tank and includes a vertical bar and a float positioned according to liquid level. The Guerrini device establishes an inverse correlation between circuit resistance and fluid level.

Hoppert et al., U.S. Pat. No. 4,567,762 discloses a thermoelectric level detector including a meandering resistive path which repeatedly transverses the axis of the impedance element. The resistance of the meandering path is dependent upon temperature and provides a measure of liquid level.

Coulange, U.S. Pat. No. 4,454,761 discloses a liquid level detector including a slidable float and a winding disposed about the periphery of a rod. The float's vertical position, as defined by the liquid level, controls the resistance of the winding.

Bjork, U.S. Pat. No. 4,052,901 discloses a level detecting apparatus including an elongated flexible substrate transducer which is shorted out in the portion thereof subject to a threshold pressure. The resistance produced is inversely proportional to the liquid level.

DeGiers, U.S. Pat. No. 2,484,690 discloses an electric liquid level indicating device including a resistor element, a common conductor, a plurality of flexible sliding members between the resistor element and the common conductor, and a magnet attached to a float. The magnet shorts out the resistor at the liquid level by attracting a corresponding flexible sliding member.

German Patent 2758379 discloses a potentiometer for indicating liquid levels including a chain of resistors connected to reed relays. The relays are actuated by a permanent magnet attached to a float. The resistance of the potentionmeter is proportional to the liquid level.

An improved liquid level sensor with highly reliable components yet economical to manufacture is needed.

SUMMARY OF THE INVENTION

A liquid level sensor for providing a variable resistance corresponding to fluid level in a container according to one aspect of the present invention comprises a conductive rod having a first end and a second end. An insulator is attached to and covers the conductive rod. The insulator includes a first aperture near the second end of the conductive rod. A resistive strip is attached to the insulator. The resistive strip is substantially aligned with the longitudinal axis of the conductive rod, the resistive strip being electrically connected to the rod through the first aperture. A conductive strip is attached to the insulator and disposed substantially in parallel with the resistive strip. A float having a hole axially receives the insulator covered conductive rod therein, wherein the float is positioned relative to the rod according to the liquid level in the container. Electrical contact means are attached to the float for establishing an electrical connection between the resistive strip and the conductive strip.

A liquid level sensor for providing a variable resistance corresponding to fluid level in a container according to another aspect of the present invention includes a non-conductive rod having a first end and a second end. A resistive strip is attached to the rod, the resistive strip substantially axially aligned with the rod. A first conductive strip is attached to the rod, the conductive strip disposed substantially in parallel with the resistive strip. The first conductive strip is electrically connected to the resistive strip near the second end of the rod. A second conductive strip is attached to the insulator, the second conductive strip being disposed substantially in parallel with the resistive strip. A float having a hole axially receives the rod therein, wherein the float is positioned relative to the rod according to the liquid level in the container. Electrical contact means are attached to the float for continuously establishing an electrical connection between the resistive strip and the second conductive strip.

One object of the present invention is to provide an improved liquid level sensor. A second object of the present invention is to provide a liquid level sensor which is configurable to provide a resistance proportional to the cross-sectional contours of the container in which the sensor is mounted. A third object of the present invention is to provide a reliable liquid level sensor with a resistive element of improved reliabilty.

Related objects and advantages of the present invention will be more apparent from the following description of the preferred embodiments.

BRIEF DESCRIPTION OF THE DRAWINGS

FIG. 1 is a front elevational view of a first embodiment of a liquid level sensor according to the present invention.

FIG. 1A is a plan view of the sensor of FIG. 1.

FIG. 1B is an enlarged cross-sectioinal view of the sensor of FIG. 1 looking in the direction of the arrows labelled 1B.

FIG. 2 is a front elevational view of a second embodiment of a liquid level sensor according to the present invention.

FIG. 2A is a plan view of the sensor of FIG. 2.

FIG. 2B is an enlarged cross-sectional view of the sensor of FIG. 2 looking in the direction of the arrows labelled 2B.

FIG. 3 is a rear elevational view of the sensor of FIG. 1.

FIG. 3A is a rear elevational view of the sensor of FIG. 2.

FIG. 4 is a partial cross-sectional side view depicting the contacts within the float of the sensor in FIG. 1.

FIG. 5 is a cross-sectional view looking in the direction of the arrows labelled 5 in FIG. 1.

FIG. 6 is an enlarged partial front elevational view of the resistive strip and conductor bars of the sensor of FIG. 1.

DESCRIPTION OF THE PREFERRED EMBODIMENTS

Figure 4A:
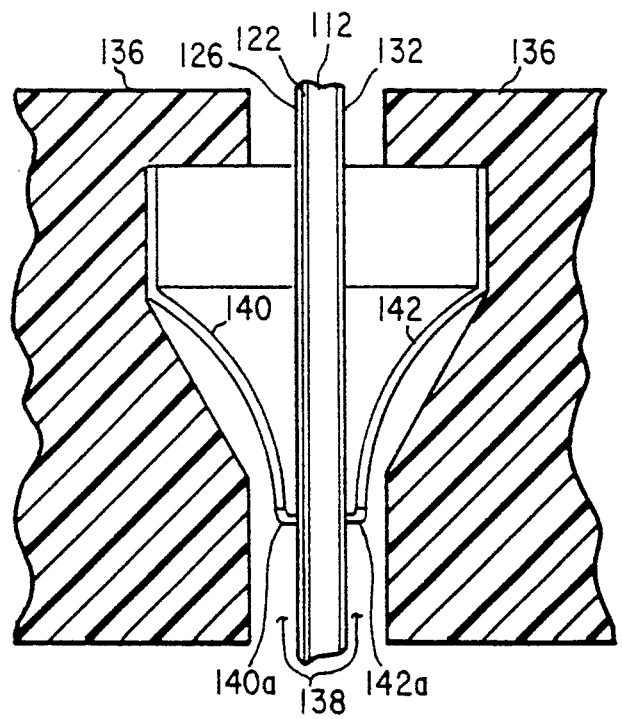
FIG. 4A is a partial cross-sectional side view depicting the contacts within the float of the sensor in FIG. 2.

For the purposes of promoting an understanding of the principles of the invention, reference will now be made to the embodiment illustrated in the drawings and specific language will be used to describe the same. It will nevertheless be understood that not limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1, 1A, and 1B, a first embodiment of a liquid level sensor 10 according to the present invention is illustrated. Sensor 10 includes an insulated conductive strip or rod 12 covered by a thin insulator 20. Rod 12 functions as a "buried conductor", providing a conductive path beneath insulator 20. A resistive strip 22 is attached to insulator 20 and is aligned with the longitudinal axis 18 of rod 12. Insulator 20 includes an aperture at 16 through which an electrical connection between the rod 12 and resistive strip 22 is established. Parallel alignment of the resistive strip 22 with the axis 18 is not a necessity for the sensor 10 to function properly, so long as the contacts 40 and 42 (shown in FIG. 4) make electrical contact with conductor bars 26.

A plurality of electrically isolated uniformly spaced conductor bars 26 are attached to resistive strip 22. Mechanical wiping of contact 40 (see FIG. 4) on conductor bars 26 prolongs the useful life of the sensor 10 since the resistive strip 22 is unaffected by repeated contact between the bars 26 and contact 40 and allows up to 100 milliamps to be applied through the contact 40. Lower contact resistance allows more current to pass through contact 40 to resistive strip 22 without oxidation or erosion of the conductive strip 32 and contact 42.

Probe pads 33 are attached to insulator 20 and electrically connected to resistive strip 22. Probe pads 33 enable electrical contact with predetermined locations on resistive strip 22 for laser trimming purposes. Laser trimming of the resistive strip 22 is one technique known for tailoring the resistance of resistive strip 22 to the cross-sectional contour of the liquid container in which the sensor is utilized. However, where the tank cross-section is rectangular, resistive strip 22 will also be rectangular.

Rod 12 has a rectangular cross-section (see FIG. 1B) and is preferably made of steel. Insulator 20 prevents galvanic activity which may cause erosion of resistive strip 22 and conductive strip 32 (see FIG. 3) when the strips 22 and 32 are subjected to DC power in a conductive media such as water. Water often collects in the bottom of fuel tanks. Such electrolytic action is prevented by depositing an insulator 20, a low alkali porcelain enamel coating with a thickness of 0.2 mm, on rod 12. Resistive strip 22 is a cermet (ceramic and metallic) thick film fabricated using glass and metal particles. The cermet material consists of approximately 80% glass fused to the porcelain enamel of insulator 20 in a 0.025 mm thick layer. The high glass content prevents oxidation or chemical attack on the metallic components of resistive strip 22. The composition of resistive strip 22 provides a resistance per unit length in the range of 10 to 100 ohms per linear inch. Resistive strip 22 is attached to insulator 20 by screen printing, sputtering, electrochemical etching, or other applicable method known in the art of thick film processing.

Rod 12 is electrically connected to resistive strip 22 through an aperture in insulator 20 at 16, hereinafter referred to as the interface between resistive strip 22 and rod 12. The interface includes a nickel metallization layer which is thermally bonded to steel rod 12 in the aperture at 16. A palladium and silver thick film material is next thermally bonded to the nickel metallization layer. The bonding agent used to thermally bond the palladium/silver thick film to the nickel metallization layer is glass. Resistive strip 22 is applied over the bonding agent and thermally fussed thereto. The interface is one suggested technique to electrically connect rod 12 to resistive strip 22.

Float 36, shown in cutaway form, is disposed about the periphery of the insulator 20 and rod 12. Float 36 is typically made from a closed cell foam material well known in the art. One closed cell foam material is known commonly as nitrile rubber. Float 36 is positioned vertically according to the liquid level in the container.

Terminal 44 is electrically and mechanically attached to insulated conductive rod 12 with fastener or rivet 24 through a hole in rod 12 at 14. Fastener 24 is a rivet, however, solder is also contemplated for attaching the terminals to the sensor 10. An opening or aperture in insulator 20 at 12a facilitates an electrical connection between the terminal 44 and rod 12. A nickel metallization layer is applied to the exposed rod 12 at 12a to prevent corrosion of rod 12 where exposed. Terminal 44 includes barbs or raised abrasive points disposed toward the mating surface between terminal 44 and rod 12 to facilitate a good electrical connection to the rod 12. Terminal 46 is electrically connected to resistive strip 22 by thin film conductive strip 21. Terminal 46 is secured to the rod/insulator by a fastener or rivet 25 which extends through an aperture or hole in rod 12 at 15. The aperture at 15 is entirely coated on the interior by insulator 20. Non-conductive centering washers 23 (made of non-conductive material such as nylon or other sutiable polymers) isolate terminal 48 from rod 12 as well as from terminals 44 and 46. terminals 44 and 46 are also made from tin plated brass. Conductive strip 21 is a thick film material consisting of glass, palladium and silver which is thermally fused to insulator 20.

Referring now to FIG. 4, a cross-sectional view of the float of the sensor 10 of FIG. 1 is shown. Rod 12 is axially inserted through hole 38 in float 36. Contact 40 and contact 42 are spring biased towards rod 12, and comprise an electrical contact means which provides an electrical connection between conductor bars 26, contact 42, contact 40, and conductive strip 32. Resistive strip 22 is also shown.

A preferred design of contact 40 and contact 42 is a multi-finger hoe configuration (shown in FIG. 5). This configuration adds to the reliability of the sensor because it applies low frictional force against conductor bars 26 and conductive strip 32. Electrical noise is minimized with the contact configuration shown. The configuration of contacts 40 and 42 also provides high corrosion resistance and a constant cross-sectional area over the life of the sensor. Contacts 40 and 42 are attached to float 36 and extend into hole 38 to minimize any physical damage to the contacts during manufacturing. Contacts 40 and 42 are electrically connected. Contact tips 40a and 42a are attached to contacts 40 and 42, respectively. Contact tips 40a and 42a are made of materials suitable for electrical contact applications.

A preferred precious metal alloy used in the construction of contact tips 40a and 42a is palladium and silver or solid silver contacts. Typically the contact tips 40a and 42a are precious metal and the remaining portion of the contacts 40 and 42 is beryllium copper. Beryllium copper, as is well-known in the art, is a resilient spring-like material which is often used in leaf spring contact applications. Other precious metal alloys such as silver/nickel and silver/cadmium alloys are also contemplated as materials which may be used for fabricating contact tips 40a and 42a. The precious metal contact tips are joined to the beryllium copper leaf spring by rivets, crimping, silver soldering or other well-known attachment techniques.

Referring to FIG. 5, cross-sectional view looking in the direction of the arrows labelled 5 of the embodiment of FIG. 1 is shown. Rod 12 is shown located beneath the insulator 20. Float 36 is disposed about the rod and insulator. Hole 38 is sized to receive and center rod 12 with respect to contact tips 40a and 42a yet allow free movement of float 36 vertically with respect to rod 12. Contact tips 40a and 42a make physical contact with conductor bars 26 and conductive strip 32, respectively. Resistive strip 22 is shown attached to insulator 20 and conductor bars 26.

FIG. 6 is a partial front elevational view of the resistive strip 22 and conductor bars 26 of the sensor 10. Conductor bars 26 extended from resistive strip 22 at an angle slightly different from the perpendicular to prevent contact tip 40a from falling in the non-conductive porcelain area between each of the bars 26. Conductor bars 26 are uniformly spaced and arranged in parallel to provide electrical contact with resistive strip 22.

Referring now to FIGS. 2, 2A and 2B, a second embodiment of a sensor 110 according to the present invention is illustrated. Sensor 110 includes a non-conductive rod 112 to which resistive strip 122, conductive strip 121 and conductive strip 131 are attached. Strips 121, 122 and 131 are thick film materials thermally bonded to the surface of the rod 112. Conductive strips 121 and 131 overlap strip 122 at 116 and 116a to make electrical connections with the ends of resistive strip 122. Thermal bonding of the thick film materials of strips 122 and 131 establishes the electrical connection between the strips. The conductive strips 121 and 131 are thick film materials consisting of glass, palladium and silver which are thermally fused to rod 112. Terminal 144 is electrically connected with conductive strip 131 beneath terminal 144. Similarly, terminal 146 is electrically connected with conductive strip 121 beneath terminal 146. It is also comtemplated that terminals 144 and 146 may be soldered to conductive strips 131 and 121, respectively, to complete the corresponding electrical connections. Terminals 144 and 146 may include barbs (not shown) or raised projections facing inward rod 112. The barbs aid in establishing an electrical connection with the strips 121 and 131 when mechanical fasteners such as rivets 124 and 125 are used to attach the terminals 144, 146 and 148 to the rod 112. Terminal 144 and terminal 146 are attached to rod 112 through holes at 114 and 115, respectively. Insulating washers 123 isolate terminals 146 and 148 from terminal 148 and perform the same function as washers 23 of sensor 10.

Float 136 moves along axis 118 in accordance with liquid levels. Probe pads 133 provide convenient manufacturing connections to predetermined locations of resistive strip 122 to assist in laser trimming operations wherein the resistance of the strip 122 is "trimmed" to correspond with the cross-sectional contours of the container (not shown) in which the sensor 110 will be used. Conductor bars 126 are identical with the conductor bars of the embodiment of FIG. 1, and provide a low contact resistance connection between the resistive strip 122 and the float contacts 140 and 142 (not shown) in FIG. 4A).

Non-conductive rod 112 is a ceramic substrate having a rectangular cross-section. An alumina ceramic substrate is preferred for the rod 112. Other non-conductor materials are also contemplated as suitable substrate materials.

Referring now to FIG. 3, a rear elevational view of the sensor 10 of FIG. 1 is illustrated. Conductive strip 32, fabricated using thick film technology, is attached to insulator 20. Strip 32 consists of a mixture of glass, palladium, and silver which presents a smooth, non-abrasive surface against which contact 40 (FIG. 4) brushes. Conductive strip 32 is made from the same material as conductive strip 21. Conductive strips 21 and 32 fuse with and slightly sink into the procelain enamel of insulator 20 or rod 13 during thermal bonding. Conductive strips 21 and 32 and resistive strip 22 are deposited by screen printing, sputtering, electrochemical etching, or any other applicable method. Terminal 48 is electrically attached to conductive strip 32 adjacent terminal 44 and terminal 46. Terminal 48 includes barbs to ensure proper electrical connections and is made from tin plated brass.

Referring now to FIG. 3A, a rear elevational view of the sensor 110 of FIG. 2 is illustrated. Conductive strip 132, fabricated using thick film technology, is attached to rod 112. Strip 132 consists of a mixture of glass, palladium, and silver which presents a smooth, non-abrasive surface against which contact 140 (FIG. 4A) brushes. Conductive strip 132 is made from the same material as conductive strips 121 and 131. Conductive strips 121, 131 and 132 and resistive strip 122 are deposited by screen printing, sputtering, electrochemical etching, or any other applicable method and subsequently thermally fused to the substrate or rod 112. Terminal 148 is electrically attached to conductive strip 132 and is located opposite terminal 144 and terminal 146. Terminal 148 includes barbs to ensure proper electrical connections and is made from tin plated brass.

Referring now to FIG. 4A, a cross-sectional view of the float 136 of sensor 110 is shown. Rod 112 is axially inserted through hole 138 in float 136. Contact 140 and contact 142 are spring biased towards rod 112, and comprise an electrical contact means which provides an electrical connection between conductor bars 126 and conductive strip 132. Resistive strip 122 is also shown.

Figures 5A, 6A:
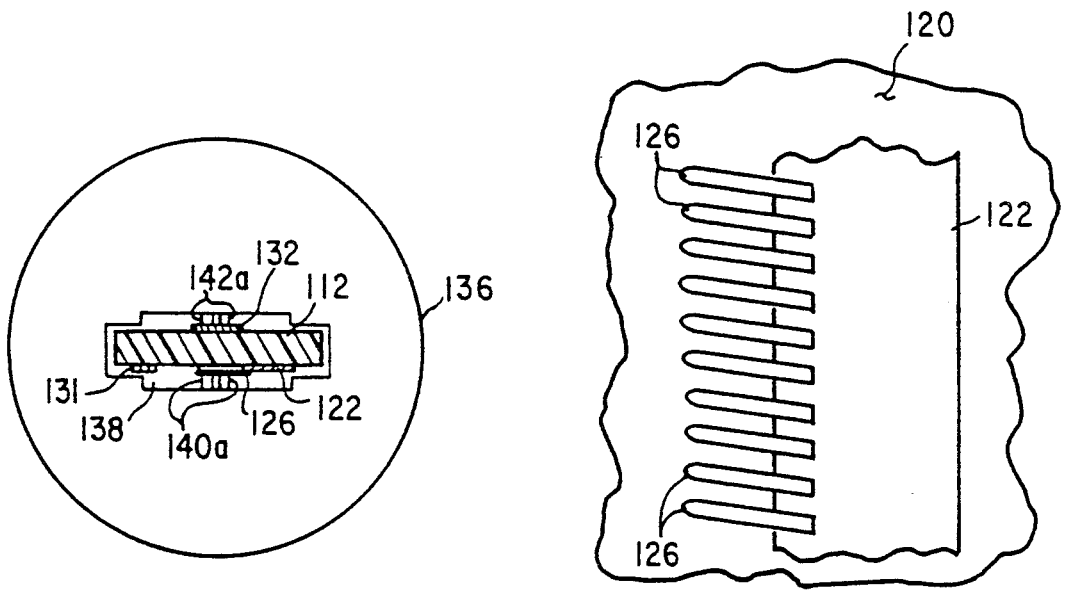
FIG. 5A is a cross-sectional view looking in the direction of the arrows labelled 5A in FIG. 2.
FIG. 6A is an enlarged partial front elevational view of the resistive strip and conductor bars of the sensor of FIG. 2.

A preferred design of contact 140 and contact 142 is a multi-finger hoe configuration (shown in FIG. 5A). This configuration adds to the reliability of the sensor because it applies low frictional force against conductor bars 126 and conductive strip 132. Electrical noise is minimized with the contact configuration shown. The configuration of contacts 140 and 142 also provides high corrosion resistance and a constant cross-sectional area over the life of the sensor. Contacts 140 and 142 are attached to float 136 and extend into the hole 138 to minimize any physical damage to the contacts during manufacturing. Contacts 140 and 142 are electrically connected. Contact tips 140a and 142a are attached to contacts 140 and 142, respectively. Contact tips 140a and 142a are made of materials suitable for electrical contact applications.

A preferred precious metal alloy used int the construction of contact tips 140a and 142a is a palladium and silver or solid silver contacts. Typically the contact tips 140a and 142a are precious metal and the remaining portion of the contacts 140 and 142 is beryllium copper. Beryllium copper, as is well-known in the art, is a resilient spring-like material which is often used in leaf spring contact applications. Other precious metal alloys such as silver/nickel and silver/cadmiun alloys are also contemplated as materials which may be used for fabricating contact tips 140a and 142a. The precious metal contact tips are joined to the beryllium copper leaf spring by rivets, crimping, silver soldering or other well-know attachement techniques.

Referring to FIG. 5A, a cross-sectional view looking in the direction of the arrows labelled 5A of the embodiment of FIG. 1 is shown. Rod 112 is shown disposed within the float 136. Hole 138 is sized to receive and center rod 112 with respect to contacts 140 and 142 yet allow free movement of float 136 vertically with respect to rod 112. Contact tips 140a and 142a make physical contact with conductor bars 126 and conductive strip 132, respectively. Resistive strip 122 is shown attached to rod 112 and bars 126.

FIG. 6A is a partial front elevational view of the resistive strip 122 and conductor bars 126 of the sensor 110. Conductor bars 126 extend from resistive strip 122 at an angle slightly different from the perpendicular to prevent contact tips 140a and 142a from falling in the non-conductive area between each of the bars 126. Conductor bars 126 are uniformly spaced and arranged in parallel to provide electrical contact with resistive strip 122.

Sensors 10 and 110 are three wire position sensors or transducers. Three wire sensors are connectable to a fixed DC reference voltage (at terminals 44 and 46 or terminals 144 and 146) so that a reliable wiper voltage is available (at terminals 48 or 148). Voltage sensing obviates resistance deviations of the strips 22 and 122 which may occur as a result of temperature, aging, or surface oxidation and erosion. Sensors 10 and 110 convert the physical position of floats 36 and 136, respectively, into a resistance or voltage which is directly proportional to the liquid level in the container. Terminals 44 and 46 are resistor connections, and terminal 48 is the wiper connection of the potentiometric sensor 10. Likewise, terminals 144 and 146 are resistor connections, and terminal 148 is the wiper connection of the potentiometric sensor 110. A suggested application of the sensors 10 and 110 is hereafter described. The sensors 10 or 110 are vertically oriented in a fuel tank and secured thereto by a mounting flange at the top and bottom of the sensors. Terminal 44 (144), terminal 46 (146), and terminal 48 (148) are connectable to outside circuitry to provide a resistive or proportional voltage signal corresponding to liquid level in the fuel tank. The sensors 10 and 110 may also be mounted within a baffle cylinder (not shown) which is normally attached to a mounting flange. The baffle cylinder attenuates sloshing about of the fuel in the tank when the motor vehicle is in motion. The baffle cylinder enables stable and reliable measurements of the liquid level.

Sensor 10 is economically pratical in the 10 to 25 cm length range, which covers the majority of automobile applications. For smaller length sensors and lower quantity requirements the use of sensor 110 made of alumina ceramic substrates is preferred. Sensors 110 in the 7 to 15 cm length can be fabricated from laser scribed ceramic substrates very quickly with very little tooling cost.

Sensors using thick film cermet on porcelain and ceramic substrates are satisfactory for use in gasoline, diesel fuel, methanol blends, lubricating oil, refrigerant and other non-conductive, relatively uncontaminated fluids.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A liquid level sensor for providing a variable resistance corresponding to fluid level in a container, said sensor comprising:

a conductive rod having a first end and second end;

an insulator attached to and covering said conductive rod, said insulator including a first aperture near said second end of said conductive rod;

a resistance strip attached to said insulator, said resistive stip substantially aligned with the longitudinal axis of said conductive rod, and said resistive strip being electrically connected to said rod through said first aperture;

a conductive strip attached to said insulator, said conductive strip disposed substantially in parallel with said resistive strip;

a float having a hole for axially receiving said conductive rod and said insulator therein, wherein said float is positioned according to the liqiud level in the container;

electrical contact means attached to said float for establishing an electrical connection between said resistive strip and said conductive strip.

2. The liquid level sensor of claim 1 wherein said conductive rod is substantially rectangular in cross-section.

3. The liquid level sensor of claim 2 including a plurality of uniformly spaced apart conductor bars attached to said resistive strip and wherein said electrical contact means established an electrical connection between said conductor bars and said conductive strip.

4. The liquid level sensor of claim 1 wherein said electrical contact means includes at least two metallic contacts situated in substantially opposing relationship and spring biased toward one another, said contacts receiving said rod therebetween and wherein said rod is substantially rectangular in cross-section.

5. The liquid level sensor of claim 4 wherein said resistive strip is a screen printed cermet thick film and said conductive strip is a screen printed conductive thick flim, and wherein said resistive strip and said conductive strip are thermally fused to said insulator.

6. The liquid level sensor of claim 5 including:
a first terminal;
a second terminal attached to said sensor and electrically connected to said resistive strip;
a third terminal attached to said sensor and electrically connected to said conductive strip; and
wherein said insulator includes a second aperture near said first end of said conductive rod and said first terminal is attached to said sensor and electrically connected to said rod through said second aperture.

7. A liquid level sensor for providing a variable resistance corresponding to fluid level in a container, said sensor comprising:
a conductive rod having a first end and a second end;
an insulator attached to and covering said conductive rod, said insulator including a first aperture near said second end of said conductive rod;
a resistive strip attached to said insulator, said resistive strip substantially aligned with the longitudinal axis of said conductive rod, and said resistive strip being electrically connected to said rod through said first aperture;
a conductive strip attached to said insulator, said conductive strip disposed substantially in parallel with said resistive strip;
a float having a hole for axially receiving said conductive rod and said insulator therein, wherein said float is positioned according to the liquid level in the container;

electrical contact means attached to said float for establishing an electrical connection between said resistive strip and said conductive strip;

wherein said electrical contact means includes at least two metallic contacts situated in substantially opposing relationship and spring biased toward one another, said contacts receiving said road therebetween and wherein said rod is substantially rectangular in cross-section;

wherein said resistive strip is a screen printed cermet thick film and said conductive strip is a screen printed conductive thick film, and wherein said resistive strip and said conductive strip are thermally fused to said insulator;

a first terminal;
a second terminal attached to said sensor and electrically connected to said resistive strip;
a third terminal attached to said sensor and electrically connected to said conductive strip;
wherein said insulator includes a second aperture near said first end of said conductive road and said first terminal is attached to said sensor and electrically connected to said rod through said second aperture;

a metallization layer deposited in said first and second apertures and fully covering the exposed surface of said rod in said first and second apertures of said insulator;

a palladium and silver thick film thermally bonded to said metallization layer in said first and second appertures; and wherein said conductive rod is stell and said insulator is a porcelain enamel.

8. The liquid level sensor of claim 7 including a plurality of spaced apart probe pads attached to said resistive strip, wherein said probe pads provide an electrical connection for testing the resistivity of said resistive strip at intervals between said probe pads.

9. A liquid level sensor for use in a container comprising:
a conductive rod having a first end and a second end;
an insulator attached to and substantially covering said conductive rod, said insulator including a first aperture situated near said second end of said rod;
resistance means axially disposed with respect to said rod and attached to said insulator, said resistance means attached to said rod through said first aperture;
conductor means attached to said insulator and disposed in substantially parallel relationship with said resistance means;
a float having a hole for axially receiving said conductive rod and said insulator therein, wherein said float is positioned according to the liquid level in the container;
electrical contact means attached to said float for establishing an electrical connection between said resistance means and said conductor means.

10. The liquid level sensor of claim 9 wherein said rod has at least one longitudinal planar surface.

11. The liquid level sensor of claim 10 wherein said electrical contact means includes at least two contacts situated in substantially opposing relationship and spring biased toward one another, said contacts receiving said rod therebetween.

12. The liquid level sensor of claim 11 including a plurality of uniformly spaced apart conductor bars attached to said resistance means and wherein said electrical contact means establishes an electrical connection between said conductor bars and said conductive strip.

13. The liquid level sensor of claim 12 wherein said float is a closed cell foam float.

14. The liquid level sensor of claim 13 wherein said resistance means is a screen printed cermet thick film and said conductive means is a screen printed conductive thick film, and wherein said resistance means and said conductive means are thermally fused to said insulator.

15. A liquid level sensor for use in a container comprising:

a conductive rod having a first end and a second end;

an insulator attached to and substantially covering said conductive rod, said insulator including a first aperture situated near said second end of said rod;

resistance means axially disposed with respect to said rod and attached to said insulator, said resistance means attached to said rod through said first aperture;

conductor means attached to said insulator and disposed in substantially parallel relationship with said resistance means;

a float having a hole for axially receiving said conductive rod and said insulator therein, wherein said float is positioned according to the liquid level in the container;

electrical contact means attached to said float for establishing and electrical connection between said resistance means and said conductor means;

wherein said road has at least one longitudinal planar surface;

wherein said electrical contact means includes at least two contacts situated in substantially opposing relationship and spring biased toward one another, said contacts receiving said rod therebetween;

a plurality of uniformly spaced apart conductor bars attached to said resistance means and wherein said electrical contact means establishes an electrical connection between said conductor bars and said conductive strip;

wherein said float is a closed cell foam float;

wherein said resistance means is a screen printed cermet thick film and said conductive means is a screen printed conductive thick film, and wherein said resistance means and said conductive means are thermally fused to said insulator;

a metallization layer located between said resistance means and said rod, said metallization layer situated in said first aperture and fully covering the exposed surface of said rod in said first aperture of said insulator;

a palladium and silver thick film thermally bonded to said metallization layer is said first aperture; and wherein said conductive rod is steel and said insulator is a porcelain enamel.

16. The liquid level sensor of claim 15 including a plurality of spaced apart probe pads attached to said resistive strip, wherein said probe pads provide an electrical connection for testing the resistivity of said resistive strip at intervals between said probe pads.

* * * * *

UNITED STATES PATENT AND TRADEMARK OFFICE
CERTIFICATE OF CORRECTION

PATENT NO. : 5,129,261
DATED : July 14, 1992
INVENTOR(S) : Richard E. Riley

It is certified that error appears in the above-identified patent and that said Letters Patent is hereby corrected as shown below:

In column 3, line 51, please delete "not" and insert in lieu thereof --no--.
In column 4, line 11, please delete "contact" and insert in lieu thereof --contacts--.
In column 5, line 19, please delete "terminals" and insert in lieu thereof --Terminals--.
In column 6, line 17, please insert a paragraph break between "112." and "Conductive".
In column 7, line 47, please delete "int" and insert in lieu thereof --in--.
In column 10, line 8, please delete "road" and insert in lieu thereof --rod--.
In column 10, line 21, please delete "road" and insert in lieu thereof --rod--.
In column 10, line 32, please delete "stell" and insert in lieu thereof --steel--.
In column 11, line 31, please delete "and" and insert in lieu thereof --an--.

Signed and Sealed this

Sixteenth Day of November, 1993

Attest:

BRUCE LEHMAN

*Attesting Officer*    *Commissioner of Patents and Trademarks*